United States Patent
Jackel et al.

(10) Patent No.: US 6,507,356 B1
(45) Date of Patent: Jan. 14, 2003

(54) METHOD FOR IMPROVING VIDEO CONFERENCING AND VIDEO CALLING

(75) Inventors: Lawrence David Jackel, Holmdel, NJ (US); Urs A Muller, Keyport, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/687,665

(22) Filed: Oct. 13, 2000

(51) Int. Cl.[7] ............................................. H04N 7/14
(52) U.S. Cl. ............................. 348/14.06; 348/14.01; 348/14.07
(58) Field of Search ................................ 348/14.01, 14.02, 348/14.03–14.09, 14.16; 345/753, 700, 716, 719, 723, 756, 764, 781, 788, 799

(56) References Cited

U.S. PATENT DOCUMENTS 5,786,846 A * 7/1998 Hiroaki .................... 348/14.16
6,208,373 B1 * 3/2001 Fong et al. ............... 348/14.16

FOREIGN PATENT DOCUMENTS

| JP | 408331533 A | * 12/1996 | ............ H04N/7/14 |
| JP | 02000270308 A | * 9/2000 | ............ H04N/7/15 |

* cited by examiner

*Primary Examiner*—Melur Ramakrishnaiah

(57) ABSTRACT

A method for improving video conferencing/calling between participants is disclosed. A video conference/call display window is provided to call participants. The position of the video call window is restricted to a portion of a video display screen which is close to the position of a video camera which is used during the video call. In this manner, a video call participant will be perceived to be looking at the video camera during the video call.

3 Claims, 4 Drawing Sheets

METHOD FOR IMPROVING VIDEO CONFERENCING AND VIDEO CALLING

BACKGROUND OF THE INVENTION

This invention broadly relates to multimedia conferencing wherein two or more parties interact visually and/or audibly. More particularly, the present invention pertains to a method for restricting the position of a video display window relative to the position of a video camera so that parties or participants involved in the multimedia conference/call will appear to be looking in the general direction of the camera while they are looking at the video display window.

In all areas, such as the technical, business or educational fields there is an ever-present need to meet with others to exchange ideas, information, data, drawings and the like. Typically, in the business arena, executive meetings, customer demonstrations, product development, administration matters, education/training offerings and the like usually require a conference meeting or call. Normally, a conference is the only practical means of communicating with people having a common interest in a specific subject. If the conference is with people who are located in the same building or in a common geographical area, the conference can be an extremely efficient method of transmitting ideas and resolving issues. When, however, the participants of the conference are at remote locations, i.e. different cities, some of the participants will experience inconveniences in traveling to and from the conference. Video conferencing between parties can rectify the problems associated with remotely located parties that need to communicate. Aside from conferencing, video calls are also being conducted more routinely since adding a visual component to conventional telephone calls can improve the communication process substantially.

While video conferencing or video calling can be extremely useful, the manner in which the video images are collected and displayed can be somewhat problematic. As shown in FIG. 1, a typical prior art video conferencing or calling setup for a video conference/call participant 100 includes a display 110, a video camera 120 and a video display window 130 which provides an image of the one or more other participants in the video conference/call. In this illustrated example, participant 100 has positioned the video display window 130 in a bottom left hand corner of the display 110 while the video camera 120 has been positioned at a top or superior portion of the video display 110. Thus, when participant 110 engages in the video conference/call, the participant's eyes will be directed to the video display window 130 at the bottom left hand corner of the video display 110. However, since the video camera is positioned at a distance away from the video display window 130, the other participant(s) in the video call/conference will be provided an image of participant 100 staring away from the video camera 120 since the participant's gaze is directed to the video display window 130. This phenomenon becomes apparent when any video conference/call participant positions their video display window at a place on their screen which is at a distance away from their video camera since the line of their gaze 140 will be averted to at a different angle and direction than the camera direction and focus 150.

Accordingly, it would be desirable to have a method for improving the shortcomings of prior art video conferencing/calling setups and procedures as discussed above.

SUMMARY OF THE INVENTION

The present invention is a method for providing improved video communications between participants using video displays and video cameras. In one embodiment, the present method restricts the position of a video conferencing window provided on the video display relative to the position of the video camera. The video conferencing window will be restricted to a top portion of the video display provided the video camera is positioned on top of the video display. Alternatively, the video conferencing window will be restricted to a bottom portion of the video display provided the video camera is positioned below or proximate to an inferior surface of the video display.

In another embodiment, the present invention is a method for improving a video call between two or more video call participants, each of the participants utilizing a video display and a video camera for participating in the video call, which includes providing a video call window on the video displays of the participants in the video call and restricting the position of the video call windows on the participants' video displays, wherein the video call windows are restricted to a position relative to the position of the participants' video cameras.

Any movement of the video conference/call window outside prescribed area or boundary will not be permitted or alternatively, such movement will be discouraged via a warning facility. In one embodiment, the video conference/call window will simply be returned to a position within the boundary if an attempt to move the video conference/call window outside the boundary is made.

DETAILED DESCRIPTION OF PREFERRED EMBODIMENTS

Figure 1:
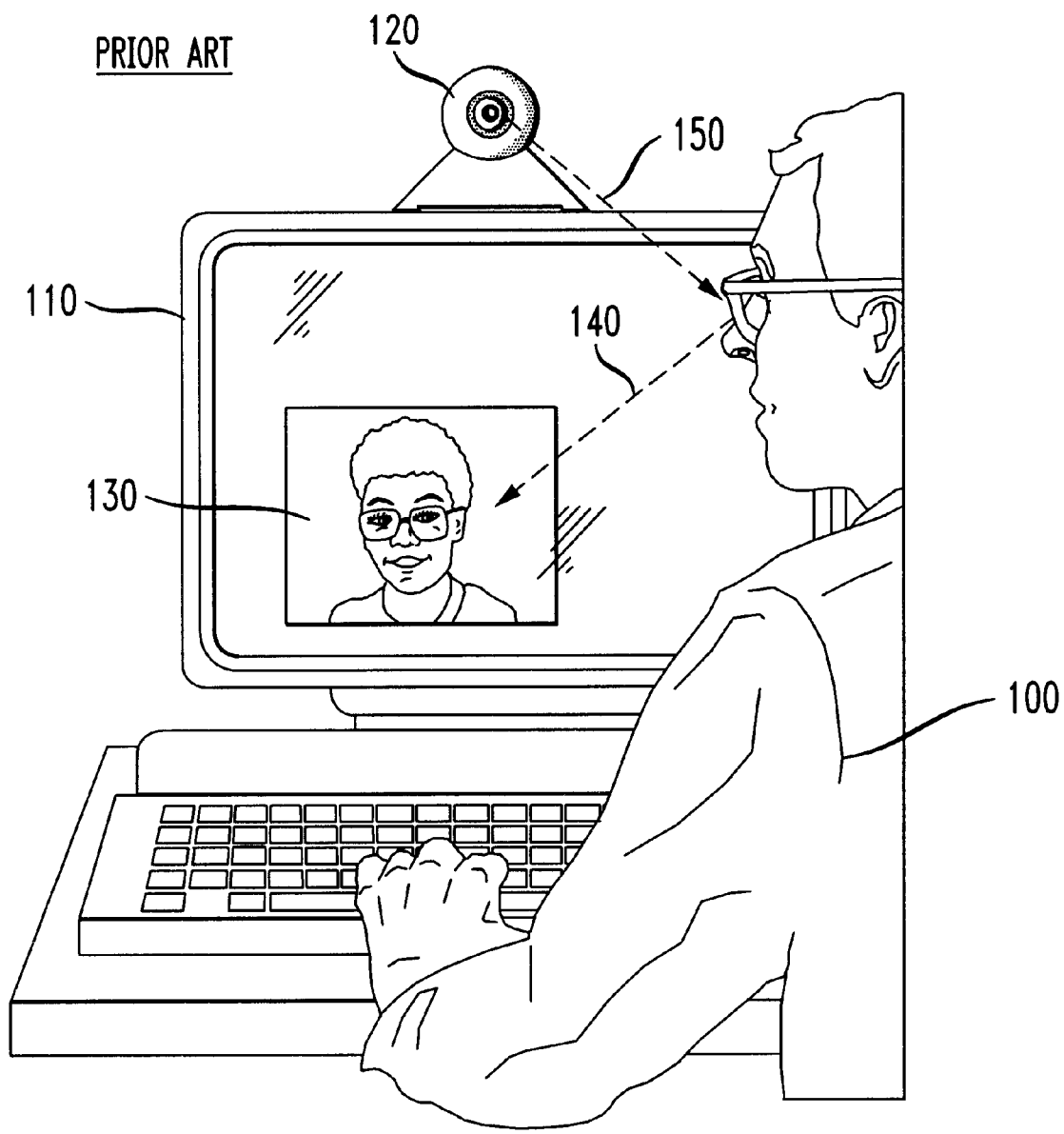
FIG. 1 shows a prior art video conference/call configuration.
Figure 2:
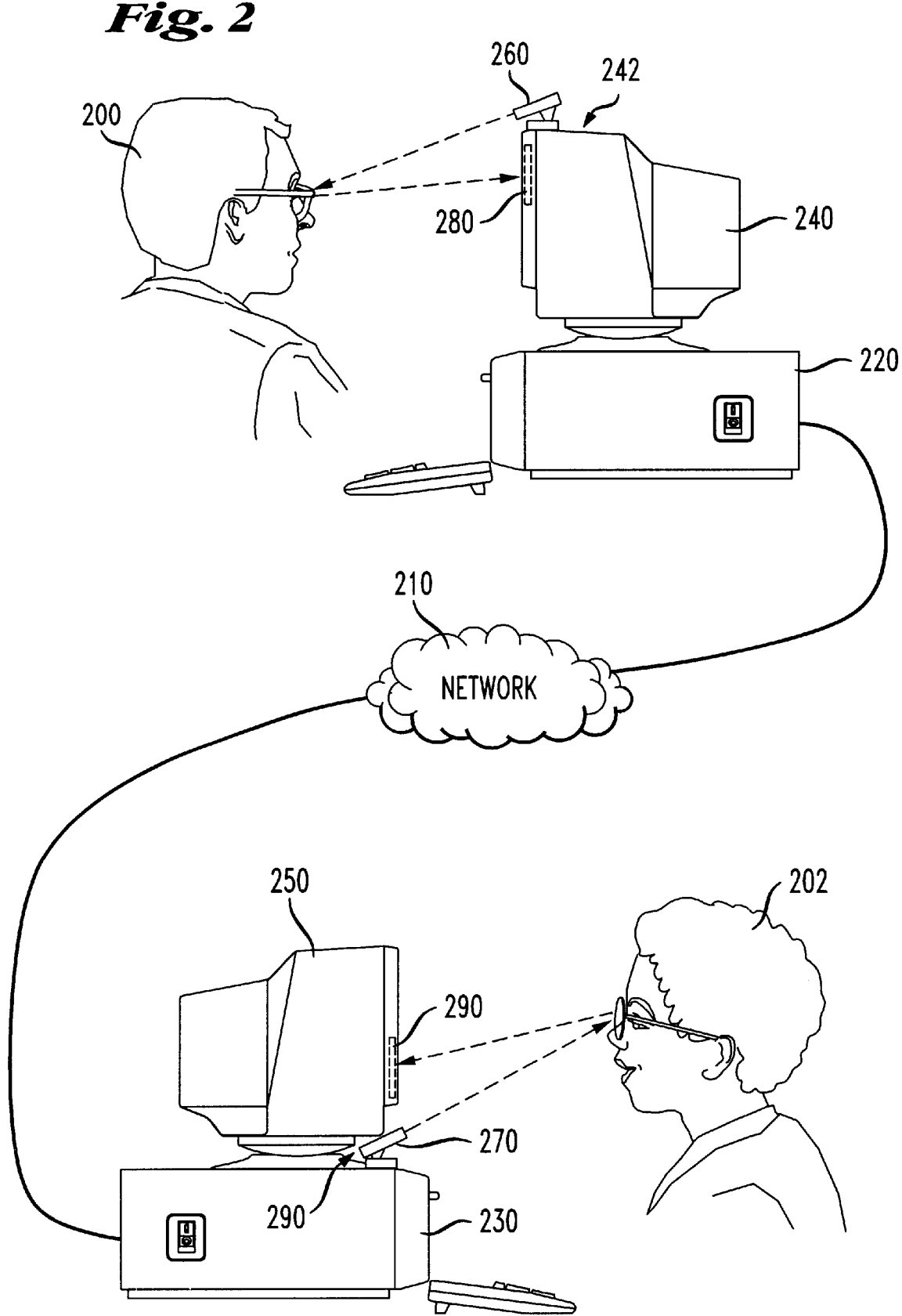
FIG. 2 shows an exemplary video conference/call configuration in accordance with the teachings of the present invention.

Referring to FIG. 2, the present invention is a method for improving video calling/conferencing wherein two or more users 200 and 202 may communicate and interact with each other over a communications network 210, such as may be provided via a broadband network connection, Integrated Services Digital Network (ISDN) line, conventional telephone line, or other similar network. The two or more users 200 and 202 will typically employ the use of equipment having audio and video input/output capabilities, such as multimedia capable computers 220 and 230 having video display screen 240 and 250 and video cameras 260 and 270 for capturing images at each end of the video call/conference. In general, the equipment being used in video calling is a workstation containing a microphone and speaker for audio exchange, a video camera and screen for video exchange and a computer for the exchange of data which may comprise, for example, reports, spreadsheets, graphs, etc. In the present invention, for a video conference/call, two or more participants can interact directly via a point-to-point connection either through a local central office for a local call, or through a main switching station for a toll call. Participants can also interact indirectly via use of a multi-point control unit (MCU) or other similar mechanism wherein each terminal/workstation is connected to and shares a common MCU.

Software is typically provided on computers 220 and 230 which interacts with the video display screens 240 and 250 and the video cameras 260 and 270 during a video call/conference to render and provide images of the call/conference participants to one another during the call/conference. Typically the images of the call/conference participants are provided via video display windows 280 and 290 which can be seen via video display screens 240 and 250. In the present invention, the video display windows 280 and 290 are movable so that call/conference participants 200 and 202 can move their respective video display windows 280 and 290 to fixed predetermined areas within their respective video display screens 240 and 250. Preferably, the fixed predetermined areas or boundaries are proximate to the location of the participants' respective video cameras 260 and 270. For example, as shown generally in FIG. 2, participant 200 has positioned video camera 260 on a top or superior surface 242 of display 240. Accordingly, in accordance with the present method, participant 200 will be restricted to positioning the video display window 280 to an area on display 240 which is proximate to video camera 260, i.e. the top portion of display screen 240. By way of further example, participant 202 has positioned video camera 270 proximate to an inferior surface 252 of the display 250 and thus participant 210 will be restricted to positioning video display window 290 to an area on display 250 which is proximate to video camera 270, i.e. the bottom portion of display screen 250.

Figure 3:
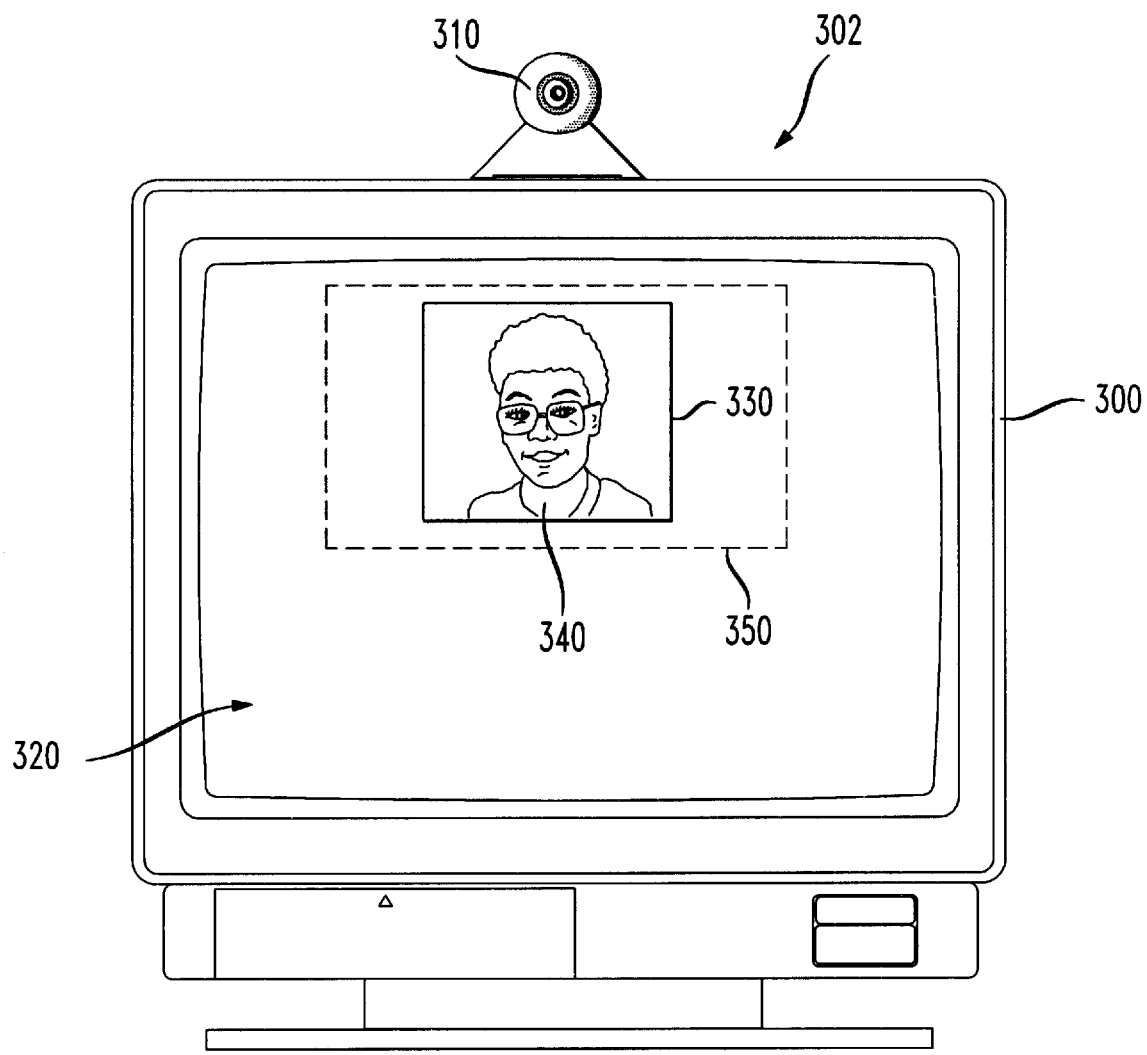
FIG. 3 shows an exemplary screen display and camera setup configuration in accordance with the teachings of the present invention.

Referring to FIG. 3, an exemplary video conference/call setup is shown for at least one conference/call participant. In this embodiment, the setup includes a display screen 300 and a video camera 310 positioned on a superior or top surface 302 of display screen 300. The display screen 300 provides a display which includes a desktop portion 320 and a video display window 330 which provides an image of one or more other video conference/call participants 340. Prior or during a video conference/call, it is contemplated that a video conference/call participant may wish to adjust or vary the position of the video display window 330 within their desktop 320 provided on display screen 300. In the present invention, the participant will be restricted or confined to relocating or moving video display window 330 within an "invisible" boundary as shown by dashed line 350. Provided the user positions the video display window 330 within the prescribed boundary 350, the re-positioning of the video display window 330 within the confines of boundary 350 will be permitted. In the present invention, the video conference/call participant will not be permitted to position the video display window 330 outside the prescribed boundary, such as in other areas of the desktop 320, as discussed in more detail later herein. As discussed in more detail later herein, the video conference/call participant may simply be discourage from positioning the video display window 330 outside the prescribed boundary.

Figure 4:
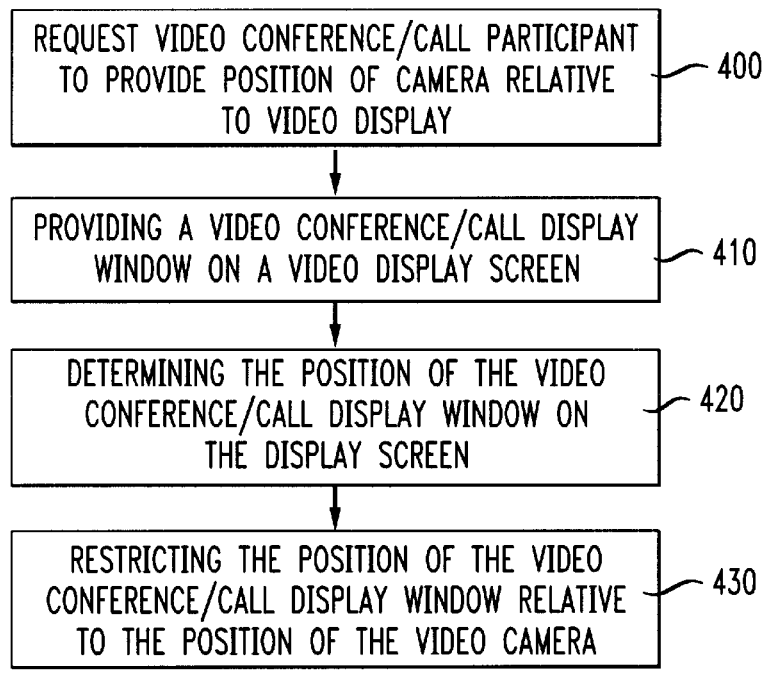
FIG. 4 is a flow chart of an exemplary method in accordance with the teachings of the present invention.

Referring to FIG. 4, an exemplary method of the present invention is shown. In the present invention, the location of the video conference/call participant's respective video camera is crucial to proper operation of the present method. In this embodiment, a user or video conference/call participant is requested to provide the location of the participant's video camera relative to the participant's video display, step 400. Preferably, the participant's video camera with either be positioned on a superior surface of the display screen or proximate to an inferior surface of the display screen. Additionally, it is preferable that the video camera is positioned generally centered at either video camera location, i.e. centered on the superior surface or centered proximate the inferior surface of the display screen. It is contemplated that the video conference/call participant will only have to provide the location of the video camera once and will not have to provide the location in subsequent video conference/calls unless the participant changes the position of the video camera. Once the user has provided the location of the video camera, a video display window is provided to the participant on the participant's video display screen, step 410. This video display window will be utilized by the participant to view the image of one or more other participants in the video conference/call. The video conference/call participant will be free to relocate the video display window within the confines of the preset boundary as discussed above such that the position of the video display window will be restricted so that the video display window will be maintained in a position proximate to the location of the video camera, step 430.

Figure 5:
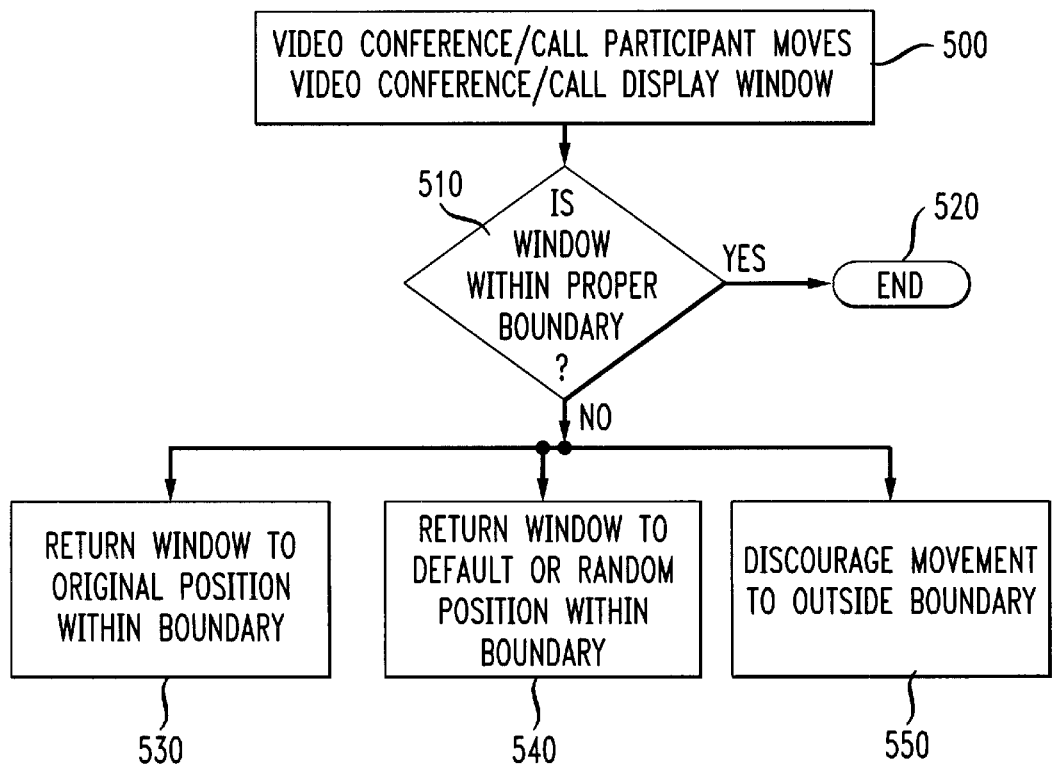
FIG. 5 is a flow chart of another exemplary method in accordance with the teachings of the present invention.

In the present invention, if a video conference/call participant attempts to position the video display window outside the prescribed boundary, a number of actions may occur. Referring to FIG. 5, a video conference/call participant moves the video conference/call window, step 500, such as by activating or selecting the video conference/call window and then dragging the video conference/call window utilizing a cursor controlling device such as a mouse, trackball or simply the arrow keys on a keyboard. Once the video conference/call window is moved, it is determined if the video conference/call window is still within the proper boundary, step 510. If the video conference/call window is still within the proper boundary, the process ends, step 520. If the video conference/call window is outside the proper boundary or alternatively, if it is determined that an attempt to position the video conference/call window outside the boundary has been attempted, a number of steps may occur.

In one embodiment, if the video conference/call participant positions the video display window outside the prescribed boundary, the video display window will be automatically repositioned to its original position within the prescribed boundary, step 530. Alternatively, the video display window may be returned to a default position or a random position within the prescribed boundary, step 540. In one embodiment, the user will simply be unable or be discouraged from positioning the video display window outside the prescribed boundary, step 550.

For example, software which implements the steps outlined herein, may detect that the user is attempting to position the video display window outside the prescribed boundary and will issue a warning, such as a pop-up window or other alerts, which signals to the user that the user has attempted to position the video display window outside the prescribed boundary. Such software may create an artificial boundary, such that any movement of the video display window outside the artificial boundary will be discouraged, i.e. the video display window will be bound to the confines of the boundary as if a physical barrier existed on the screen or alternatively, a warning notice may be provided to the user if the user moves or attempts to move the video display window outside the confines of the boundary. Such a warning notice may be provided via a pop-up window, audible alert, or other visual indicia which may alert the user that the user has moved or attempted to move the video display window outside the boundary. In one embodiment, a flashing "restore position" button may be provided to the user whereupon the user could click the "restore position" button to move the window back within the confines of the boundary.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

We claim:

1. A method for improving eye contact between video conferencing/calling participants, wherein at least one of the video conferencing participants employs a video camera coupled to a computer having a display screen, the method comprising:

providing a boundary for location of a video display window on the display screen; and restricting the position of the video display window to within the confines of the boundary, wherein the boundary is proximate to the location of the video camera and the video display window is restricted to an upper portion of the display screen proximate to the superior surface of the display screen provided the at least one of the video conferencing participants has positioned the video camera on the top of the display screen.

2. A method for improving a video call between two or more video call participants, each of the participants utilizing a video display and a video camera for participating in the video call, the method comprising:

providing a video call window on the video displays of the participants in the video call; and restricting the position of the video call windows on the participants' video displays, wherein the video call windows are restricted to a position relative to the position of the participants' video cameras, wherein the video call participants are restricted from relocating the video call windows on their respective video displays outside of a predefined area, the predefined area being an area generally proximate to the top portion the video display provided the video camera is positioned on top of the video display.

3. A method for improving a video call between two or more video call participants, each of the participants utilizing a video display and a video camera for participating in the video call, the method comprising:

providing a video call window on the video displays of the participants in the video call; and restricting the position of the video call windows on the participants' video displays, wherein the video call windows are restricted to a position relative to the position of the participants' video cameras, wherein the video call participants are restricted from relocating the video call windows on their respective video displays outside of a predefined area, the predefined area being an area generally proximate to the bottom portion the video display provided the video camera is positioned below the video display.

* * * * *